UNITED STATES PATENT OFFICE.

CHRISTOPH SÜSSEGGER, OF NEW YORK, N. Y., ASSIGNOR TO HIMSELF AND MORITZ PINNER.

IMPROVED TRANSPARENT AND FLEXIBLE MATERIAL DESIGNED AS A PARTIAL SUBSTITUTE FOR GLASS.

Specification forming part of Letters Patent No. 39,265, dated July 14, 1863.

*To all whom it may concern:*

Be it known that I, CHRISTOPH SÜSSEGGER, of the city, county, and State of New York, have invented a new, useful, and improved fabric or material which I call "flexible glass," suitable for use as a substitute for glass, mica, or similar materials where a certain degree of transparency is required, as in lanterns, transparencies, and the like; and I hereby declare that the following is a full and exact description of the same.

For many purposes it is desirable to have a material that is transparent and not easily broken. Could there be found a real flexible glass it would be just the material wanted; and the object of my invention is to supply such a material as nearly as possible. Mica has often been used and employed as a substitute for glass in the manufacture of lanterns, lamp-chimneys, lamp-shades, small window and sky lights, &c., where common glass would be too liable to be broken; but the difficulty of obtaining it in large plates or desirable forms has always made its use inconvenient for the purposes above mentioned. By my invention I prepare a material which is flexible as well as transparent, and which may be used to great advantage in the manufacture of many articles for which common glass would be used if it possessed the property of flexibility.

In order to enable others skilled in the art to make and use my invention, I now proceed to describe the mode or process of making the material which I thus designate as "flexible glass."

For the body of my material or fabric I take tinned wire webbing or cloth of about sixteen (16) to twenty (20) meshes to the inch, or flexible perforated metallic plates. This webbing, cloth, or plates I cover with a transparent material which I prepare in the following manner and proportions: I take, say, one pound of Russian or Prussian isinglass or French gelatine and put it into two quarts of cold water to let it soak for twelve hours. Then pour out the water, press the substance so as to free it from water, then put the same quantity of fresh water upon it, and let it soak another twelve hours for the purpose of dissolving it. With good isinglass two such soakings would be sufficient to purify and partially dissolve it. Rain or distilled water should be used. The complete solution may be effected by placing the vessel containing the isinglass into a hot-water bath; or, better, a vessel containing a water or steam jacket may be used. To this solution of isinglass, add one ounce each of gum-arabic and rock-candy, both being first dissolved in hot water, and to the whole add three-sixteenths ($\frac{3}{16}$) of an ounce of oxalic acid and two fluid ounces of pure alcohol. These mixtures are made while these materials are in a hot-water bath. After a complete solution and admixture of the above materials has taken place the vessel containing the solution is removed from the hot-water bath and cooled until it is nearly the point of thickening. The wire webbing, cloth, or plates are then dipped into or passed through this solution and afterward dried in the air. Whenever the solution becomes too thick it should be warmed. After the webbing or other material used has become perfectly dry it should receive one or more coats of some clear water-proof varnish, such as copal, amber, dammar, or other transparent mastic or varnish.

I have given what I regard as the best ingredient, and proportions; but I do not limit myself strictly to either, for it will be readily understood that any transparent coating covering a wire webbing or an equivalent material and filling the meshes or interstices will produce a material substantially the same as my invention.

Having thus described my invention and the mode of carrying the same into effect, I claim and desire to secure by Letters Patent of the United States—

The manufacture and use of a transparent or translucent flexible fabric or material composed of wire webbing or its equivalent, and a transparent coating or coatings, all substantially as herein set forth and described.

CHRISTOPH SÜSSEGGER.

Witnesses:
 EDM. F. BROWN,
 CHARLES SMITH.